Jan. 25, 1938.                S. RICH                2,106,225
KEYBOARD CAM ACTUATING ROLL FOR TYPESETTING MACHINES
Filed March 27, 1936
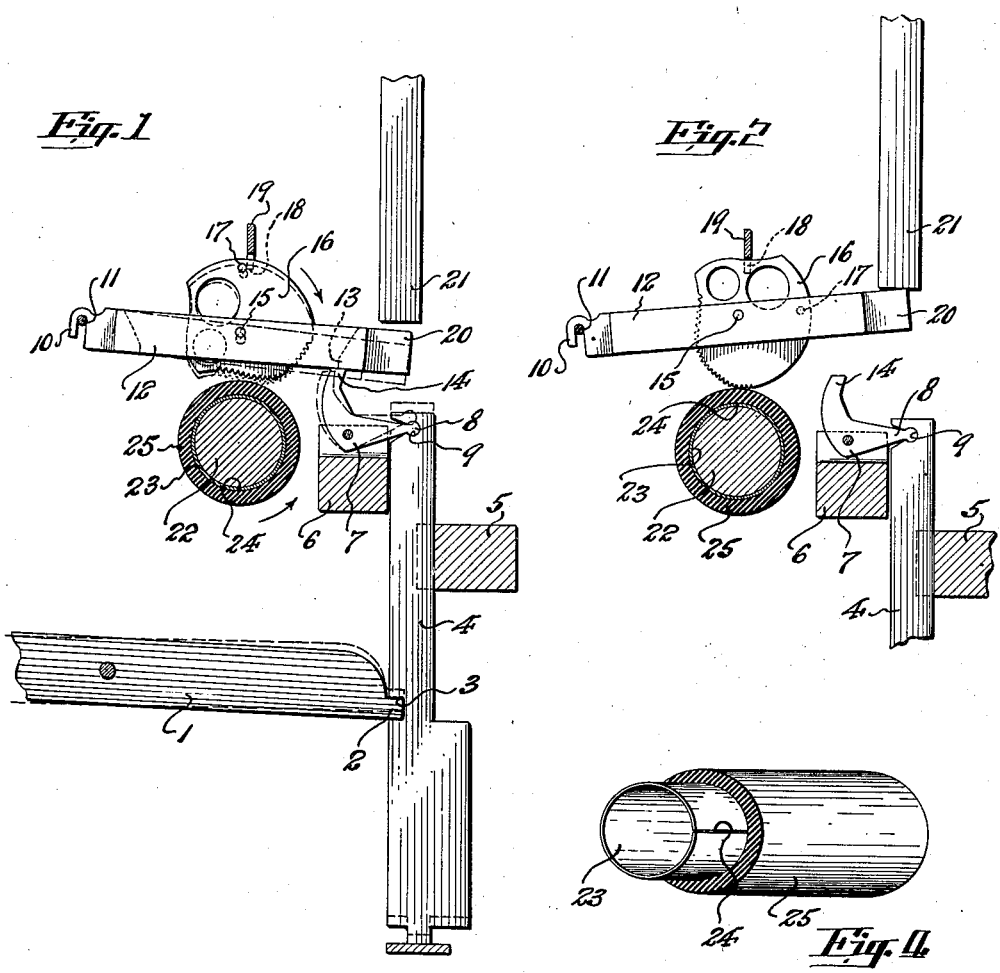
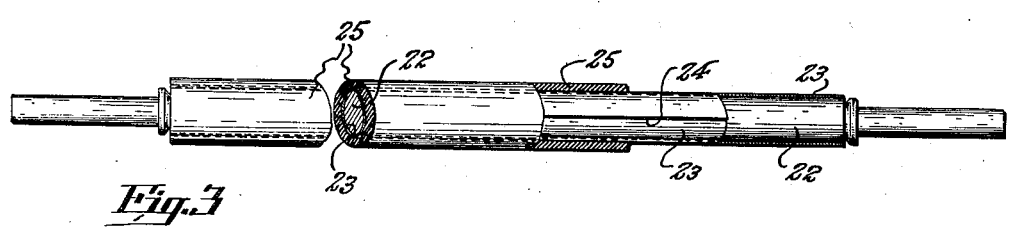
INVENTOR.
Solomon Rich,
BY George D. Richards
ATTORNEY.

Patented Jan. 25, 1938

2,106,225

UNITED STATES PATENT OFFICE 2,106,225

KEYBOARD CAM ACTUATING ROLL FOR TYPESETTING MACHINES

Solomon Rich, Glen Ridge, N. J.

Application March 27, 1936, Serial No. 71,162

4 Claims. (Cl. 199—25)

In typesetting machines, such e. g. as "Linotype" machines, the matrices are released from the magazine upon striking by the machine operator of appropriate key levers, whereby yoke triggers are actuated to trip cam and yoke assemblies so that the cams thereof operatively engage a continuously rotating rubber roll which imparts operative movement to the cam for lifting the yokes thereof, to in turn actuate the escapement devices by which the matrices are released and discharged from the magazine. The rubber roll for actuating the cams, comprises a driven shaft which is faced, throughout its operative length, with a tubular sleeve of rubber, which is slid endwise onto the shaft and frictionally engaged thereto so as to turn therewith. Ordinarily the rubber sleeve employed is made of a rubber compound containing filler material. Such filled rubber sleeves are not wholly satisfactory; first, because the same are not long resistant to wear and therefore require more or less frequent replacement; and, second, because, in wearing, particles of rubber and of the filler material combined therewith are shed therefrom and accumulate in the surrounding mechanism with dirtying and clogging effect detrimental to efficient operation of the machine. These objections could, in large measure, be overcome by using a sleeve made of substantially pure vulcanized rubber gum containing no filler material, since substantially pure vulcanized rubber is many, many times more resistant to wear, and is substantially free from tendency to slough off particles. Use of pure vulcanized rubber sleeves has not heretofore proven entirely satisfactory or successful for the reason that it is difficult to produce the same by extrusion processes, such e. g. as most economically employed in making hose or like tubular forms, and for the further reason that the frictional coefficient of such pure rubber sleeve is so high as to render exceedingly difficult the operation of sliding such sleeve lengthwise over the carrying shaft; and, furthermore, since such pure rubber sleeves are somewhat softer than filled rubber sleeves, it is difficult, in sliding the same over a shaft, to prevent uneven bunching of the mass, occurrence of which defeats the attainment of true uniform diameter of the attached sleeve evenly throughout its length.

Having the above in view, this invention has for its object to overcome the difficulties referred to, and to provide a substantially pure rubber cam roll sleeve for the purposes mentioned, which not only possesses all the advantages consequent upon the use of such pure rubber material, but which provides a sleeve thereof so arranged in combination with an inner carrier tube or liner, that it may be easily and quickly slid onto the cam roll shaft without the least danger of distorting the true uniform diameter thereof. In the preferred arrangement, the inner carrier tube or liner is of longitudinally split form, so that the enveloping rubber sleeve will, through its contractive elasticity, firmly and uniformly cause the carrier tube or liner to hug the shaft upon which it is applied so as to rotate therewith without tendency to looseness, slip or undesired play or displacement.

Other objects of this invention, not at this time more particularly enumerated, will be understood from the following detailed description of the same.

An illustrative embodiment of this invention is shown in the accompanying drawing, in which:

Fig. 1 is a fragmentary sectional view of the novel cam roll of this invention as operatively related to a cam and yoke assembly to be actuated thereby together with certain of the associated mechanism of a "Linotype" machine; Fig. 2 is a similar view showing the cam and yoke assembly as operated by engagement with the cam roll.

Fig. 3 is in part a side elevation and in part a sectional view of the cam roll shaft equipped with the novel pure rubber sleeve or facing made according to this invention; and Fig. 4 is a transverse sectional perspective of the rubber sleeve structure per se, drawn on a somewhat enlarged scale.

Similar characters of reference are employed in the above described views, to indicate corresponding parts.

Referring to the drawing, the reference character 1 indicates a pivoted key-bar of the machine, the inner end of which has a lift-tongue 2 fitting into a notch 3 of a vertically movable trigger actuating plate 4, the latter being slidably guided by a stationary banking bar 5. Extending across the upper end portion of said trigger actuating plate 4, is a trigger supporting bar 6, to which is pivoted a yoke trigger 7, the tail 8 of which is embraced by a bearing notch 9 formed in a marginal portion of said actuating plate 4 adjacent to the upper end thereof. Pivotally connected by its fulcruming hook 10 upon a fulcrum rod 11 is a yoke 12 provided with a vertically open slot extending lengthwise therethrough, said slot terminating at its outer end at a supporting lip 13, which is normally engaged by the nose 14 of said yoke trigger 7, whereby said yoke 12 is supported in an inactive position. Rotatable in the slot of said yoke 12, on a transverse axle pin 15 with which said yoke is provided, is a cam 16, a portion of the periphery of which is preferably serrated, as shown. Cam 16 is overbalanced on its high side, that is its center of gravity lies between its high side and its axis of rotation, so that when free the same will tend to swing from a normal initial position (as shown by full lines in Fig. 1) in a clockwise direction to an active position (as shown by dotted lines in Fig. 1). Cam 16 is retained in normal initial or inactive position by means of a transverse stop pin 17, with which the same is provided, and which is arrested by engagement with a depending finger 18 of a stationary stop bar 19 which extends above the cam; such engagement occurring when the yoke 12 is supported in uplifted inactive position by the yoke trigger 7 (as shown by full lines in Fig. 1). Yoke 12 is provided, at its free end, with a forwardly projecting lift lug 20, which underlies the lower end of a vertically movable matrix escapement trip bar 21. It will be understood by those familiar with "Linotype" and similar machines that there are as many of the above described sets of cam and yoke assemblies and associated elements as there are machine key bars. Underlying the cam and yoke assemblies is a cam actuating roll, comprising a continuously driven shaft 22, the peripheral surface of which is faced with a rubber sleeve. In operation, when a key bar 1 is struck by the machine operator, its inner end swings upward thereby sliding upward trigger actuating plate 4. Upward movement of plate 4 rocks the yoke trigger 7 to thereby remove its nose 14 from beneath and free of the supporting lip 13 of yoke 12. Yoke 12 will thereupon swing downward by gravity toward the cam actuating roll, and in so doing will remove the cam stop pin 17 from arrested engagement with finger 18 of stop bar 19, whereupon the overbalanced cam 16 will swing into engagement with the rotating surface of the cam roll, and will in turn be rotated. As the high part of cam 16 traverses the cam roll, it causes an upswinging movement of said yoke 12, whereby the lift lug 20 thereof is carried into lifting engagement with the matrix escapement trip bar 21, operation of which releases and discharges a corresponding matrix from the machine magazine. In the meantime, key-bar, trigger actuating plate and trigger having resumed normal initial positions, as the low part of the cam 16 traverses the cam roll, it allows the yoke 12 to descend to normal initial stopped position as supported by trigger 7, and as cam 16 completes its revolution cam stop pin 17 will reengage finger 18 of stop bar 19, thus arresting said cam in normal initial inactive position free from contact with the cam roll.

The cam actuating roll, in the novel construction thereof according to this invention, comprises an inner carrier tube or liner 23 corresponding in length to the effective length of the shaft 22. This tube or liner 23 is made of a suitable more or less springy thin material, such, for example, as thin metallic tubing. The tube or liner 23 is preferably discontinuous; that is, the same is provided with an open slit 24 extending throughout its length. The tube or liner 23 is of such diameter that, if its discontinuous edges bordering the slit 24 are butted together, the internal diameter of the same will be somewhat less than the external diameter of the shaft 22. Tube or liner 23 is enveloped in a sleeve 25 of vulcanized rubber. For best results and for maximum wear resisting characteristics, said sleeve 25 is made of pure vulcanized rubber gum; i. e. the same is made of rubber containing no, or at least but very little, mineral or other inert filler; but preferably containing none. The inherent elasticity of the sleeve 25 exerts a yieldable contractive effect upon the split tube or liner 23 which it envelops, tending therefore to normally contract the tube or liner to its minimum diameter. Preferably the sleeve 25 is bonded to the external surface of the tube or liner 23 by vulcanization, when molding the rubber to desired shape.

Owing to the provision of the inner tube or liner 23 in connection with the rubber sleeve 25, the handling of the latter, in the operation of applying or removing the same from the shaft 22, is greatly facilitated. In sliding the device onto shaft 22, the tube or liner 23 will expand laterally against the constrictive elastic tension of the sleeve 25, so as to easily engage over and slide onto the shaft; and since only the tube or liner 23 directly contacts with the shaft surface, and since the smooth surface of the tube or liner offers considerably less frictional resistance to such sliding movement than would the rubber alone, it will be obvious that attachment of the device will not only be comparatively easy, but all risk of distorting the initial and required uniform external diameter of the rubber sleeve is eliminated. Owing to the inherent contractive elasticity of the sleeve 25, the tension of which is increased by expansion of the liner or tube 23 when the same is fitted over and slid upon the shaft, once the device is operatively assembled upon the latter, such contractive tension will contract the tube or liner about the shaft with firm hugging effect, so that upon operative rotation of the shaft the rubber sleeve will rotate therewith without the least risk of slipping, shifting, looseness or other displacement during the functional service of the device as the cam actuating roll of the key-board mechanism.

It will be understood that the exterior surface of rubber sleeve 25 may be made either smooth or longitudinally corrugate, both of which types of surface are commonly used as may be desired.

Although I have above described the cam roll sleeve in a preferred form wherein the liner is of longitudinal split formation, it will be understood that, in the broader aspects of this invention, the tube or liner may be circumferentially continuous, i. e., made without said longitudinal split. In such case, the tube is sized to snugly fit the shaft, when slid thereover, with sufficient frictional contact with the latter as will be calculated to assure rotation thereof with said shaft; or it may be adhered to the shaft in any suitable manner.

From the above description it will be well understood that a greatly improved form and a more easily manipulatable cam actuating roll is provided; the same not only being easily and quickly attachable and detachable relative to its driving shaft, but, owing to the tough character of the substantially pure rubber of which its sleeve is made, being of greatly superior wearing quality, and consequently of longer serviceable life.

Having described my invention, I claim:—

1. A unitary removable facing member for a cam actuating roller shaft of the keyboard mechanism of a typesetting machine comprising, an elastic rubber sleeve and a longitudinally split metallic liner to provide an internal hard and smooth sliding surface contiguous to the bore of said sleeve, said liner being yieldably contracted by the constrictive elasticity of said sleeve to an initial internal diameter somewhat less than the external diameter of said roller shaft but subject to diametric enlargement against the yielding constrictive tension of said sleeve to permit longitudinal sliding of the facing member endwise over the roller shaft, the constrictive tension of said sleeve being operative to contract said liner into strong frictional engagement with the surface of said roller shaft so as to engage and hold said facing member on the latter for operative rotation therewith.

2. A unitary removable facing member for a cam actuating roller shaft of the keyboard mechanism of a typesetting machine as defined in claim 1, wherein the liner is bonded by vulcanization to the elastic rubber sleeve.

3. A unitary removable facing member for a cam actuating roller shaft of the keyboard mechanism of a typesetting machine as defined in claim 1, wherein the elastic rubber sleeve is made of substantially unfilled pure vulcanized rubber gum to both provide a maximum of elastic constrictive effect upon the liner as well as to provide a strongly wear resistant and non-scuffing cam engaging material.

4. A unitary removable facing member for a cam actuating roller shaft of a keyboard mechanism of a typesetting machine as defined in claim 1, wherein the liner is bonded by vulcanization to the elastic rubber sleeve, and wherein said sleeve is made of substantially unfilled pure vulcanized rubber gum to both provide a maximum of elastic constrictive effect upon the liner as well as to provide a strongly wear resistant and non-scuffing cam engaging material.

SOLOMON RICH.